Nov. 7, 1944.  M. GLUCK  2,362,002
INTERCHANGEABLE FRAMES FOR EYEGLASSES
Filed April 29, 1943

INVENTOR
Milton Gluck
BY
ATTORNEY

Patented Nov. 7, 1944

2,362,002

UNITED STATES PATENT OFFICE 2,362,002

INTERCHANGEABLE FRAME FOR EYEGLASSES

Milton Gluck, New York, N. Y.

Application April 29, 1943, Serial No. 484,984

2 Claims. (Cl. 88—47)

It is frequently necessary to provide a person with two or more sets of lenses or smoked or colored or other special glasses. To avoid the expense of a multiplicity of frames I propose to provide a frame of such construction that the lenses or glasses can be readily interchanged by anyone with the use of a screw driver.

On the other hand it is most desirable that the frames of ladies' eyeglasses match or at least harmonize with the costume worn. I have accordingly devised frames suitable for convenient interchange with the lenses.

The object of my invention is to provide a simple form of frame into which and from which the lenses can be inserted and removed when desired without the use of special tools by the wearer and without any skill.

The invention will therefore be found to provide for a convenient interchange of frames or glasses as occasion may require.

There are many ways in which this can be accomplished but for practical purposes I have hit upon the idea of providing a frame with bows of elongated or ovoid form having a groove along the lower and inner edges into which the lens can be readily set and supported and having a half groove along the back of the upper edge into which the lens can be tilted and held by a special latch or spring clip. This clip is preferably hinged to the outer edge of the frame and adapted to snap down behind the lens to hold it in place.

Figure 1:
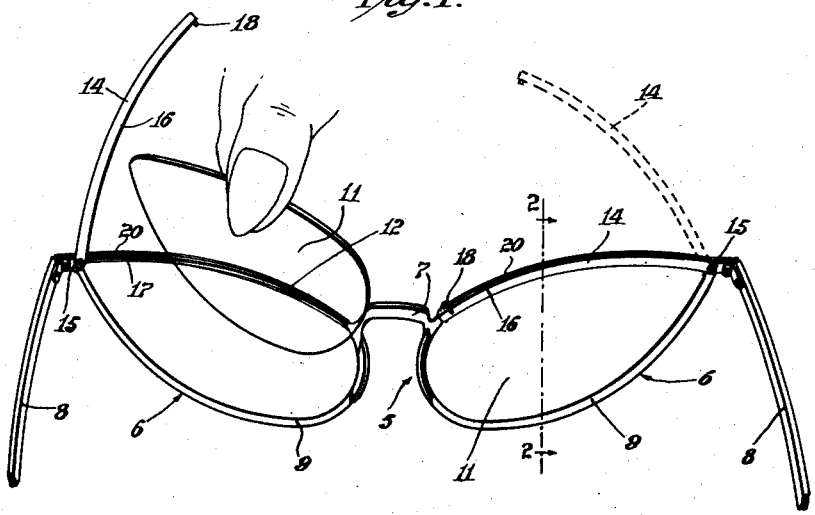
Fig. 1 is a rear view of a frame of glasses embodying one form of my invention and showing how one lens is inserted and removed.

The frame 5 is preferably of horn or plastic of suitable color, the two lens bows or loops 6, 6, being preferably elongated or ovoid with the small ends extending upwardly and outwardly and integrally connected by the bridge piece 7. Side bars 8, 8 or holding devices may be provided.

Each bow 6 has a lower half 9 provided with a groove 10 extending from near the bridge 7 to the outer, upper corner and adapted to receive and hold the lens 11. The upper half 12 of each bow has a half groove 13 open at the rear into which the lens fits when set into the groove 10 and tilted forward into place.

Figure 2:
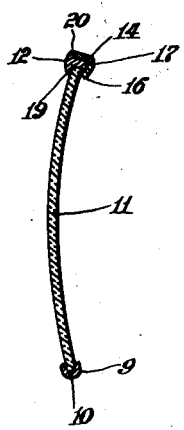
Fig. 2 is an enlarged sectional view on the plane of the line 2—2 of Fig. 1.
Figure 3:
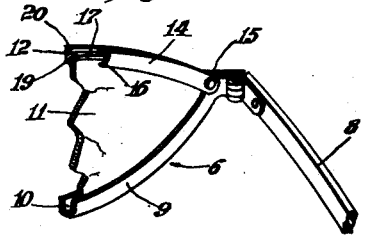
Fig. 3 is a perspective view showing the hinge-like support for the spring clip.
Figure 4:
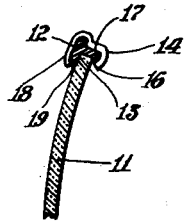
Fig. 4 is an enlarged fragmentary section showing the inner end of the latch or clip.

Here it is movably held by a clip 14 which is hinged at 15 near the outer upper corner of the frame and folded down behind the lens as shown in Figs. 2 and 3. This clip is preferably of spring material and has an edge or lug 16 which snaps over the inner edge 17 of the supporting bow while the small outer finger or lug 18 fits over the outer edge 19 of the bow as shown in Fig. 4 near the central bridge piece 7. The upper edge of the clip may be concealed behind the upper bar 20 of the bow all along the upper edge as shown in Fig. 2 except where the finger 18 fits over around the front to more securely hold the parts together. These parts are so proportioned as to permit the clip to be readily snapped down into place to hold the lens and yet permit it to be readily released and raised so as to free the lens and permit its removal. By reason of the shape of the frame it will be seen that the weight of the clip or latch tends to keep it in place.

This arrangement makes it possible to interchange the frames quite easily without springing or distorting them and without making it necessary to split the frame and use screws to clamp the parts together as is commonly done.

I claim:

1. A mounting for eyeglasses comprising two separate oval-shaped frames for removably supporting two independent oval-shaped lens members and a bridge member integrally connecting said frames, each frame including a lower frame portion adapted to embrace more than half of the edge of its respective lens member and being formed with a U-shaped groove for receiving said edge of the lens member, an upper curved integral frame portion, and a movable latching bar forming a complementary member for said upper frame portion and having one end hinged to the outer end of said upper frame portion on an axis disposed at right angles to the plane of the lens member, said upper frame portion and said latching bar when in latching position forming a U-shaped groove for receiving the remainder of the edge of the lens member and a spring finger member formed on the inner free end of said latching bar adapted to engage the upper frame portion for releasably holding the latching bar in operative position.

2. A mounting for eyeglasses comprising two discrete oval-shaped frames for removably supporting two discrete oval-shaped lens members, a bridge member connecting the inner sides of said frames, a movable latching bar on each frame, each frame including a lower frame portion adapted to embrace and support more than half of the edge of its respective lens member and being formed with a U-shaped groove for receiving said edge of the lens member and an upper curved integral frame portion, said latching bar forming a complementary member for said upper frame portion and having one end hinged to one end of said upper frame portion on an axis disposed at right angles to the plane of the frame, said upper frame portion and said latching bar when in latching position forming a U-shaped groove for receiving and holding the remainder of the edge of the lens member, and means for detachably connecting the free ends of the latching bars to the respective frames, said latching bars serving to removably and independently hold the lens members in supported position in the respective frames.

MILTON GLUCK.